United States Patent
Hastreiter

(10) Patent No.: US 9,435,709 B2
(45) Date of Patent: Sep. 6, 2016

(54) DEGRADATION MONITORING SYSTEM FOR HOSE ASSEMBLY

(75) Inventor: James Joseph Hastreiter, Chanhassen, MN (US)

(73) Assignee: Eaton Corporation, Cleveland, OH (US)

( * ) Notice: Subject to any disclaimer, the term of this patent is extended or adjusted under 35 U.S.C. 154(b) by 818 days.

(21) Appl. No.: 13/458,691

(22) Filed: Apr. 27, 2012

(65) Prior Publication Data

US 2012/0278018 A1 Nov. 1, 2012

Related U.S. Application Data

(60) Provisional application No. 61/480,924, filed on Apr. 29, 2011.

(51) Int. Cl.
  *G01R 25/00* (2006.01)
  *G01R 31/00* (2006.01)
  *G01M 3/18* (2006.01)

(52) U.S. Cl.
  CPC .................................... *G01M 3/18* (2013.01)

(58) Field of Classification Search
  CPC .. F15B 2201/00; F15B 2211/00; F15B 1/00; F15B 7/00; F15B 11/00; F15B 13/00; F15B 17/00; F15B 15/00; F15B 2211/212; F15B 2211/30505; G01N 1/00; G01N 2201/00; G01N 2203/00; G01M 3/18; F16L 11/127
  USPC .......................................... 702/65, 58; 73/38
  See application file for complete search history.

(56) References Cited

U.S. PATENT DOCUMENTS

| | | |
|---|---|---|
| 2,291,070 A | 7/1942 | Bruno |
| 2,436,949 A | 3/1948 | Anderson |
| 4,029,889 A | 6/1977 | Mizuochi |
| 4,229,613 A | 10/1980 | Braun |
| 4,446,892 A | 5/1984 | Maxwell |
| 5,267,670 A | 12/1993 | Foster |
| 5,343,738 A | 9/1994 | Skaggs |
| 5,387,899 A | 2/1995 | DiLauro et al. |
| 5,442,310 A | 8/1995 | Jenquin |
| 5,551,484 A | 9/1996 | Charboneau |

(Continued)

FOREIGN PATENT DOCUMENTS

| | | |
|---|---|---|
| DE | 3140804 A1 | 4/1983 |
| DE | 40 03 788 A1 | 8/1991 |

(Continued)

OTHER PUBLICATIONS

International Search Report and Written Opinion mailed Jul. 16, 2012.

(Continued)

*Primary Examiner* — Michael Nghiem
*Assistant Examiner* — Eman Alkafawi
(74) *Attorney, Agent, or Firm* — Merchant & Gould P.C.

(57) ABSTRACT

A system and method for detecting hose degradation are disclosed. In one aspect, a hose degradation monitoring system includes a hose assembly including a hose having a first conductive layer and a second conductive layer, and a monitoring circuit in electrical communication with the first and second conductive layers. The degradation monitoring circuit includes a circuit element having a non-linear electrical property in response to changed voltage.

14 Claims, 11 Drawing Sheets

(56) References Cited

U.S. PATENT DOCUMENTS

| | | |
|---|---|---|
| 5,634,497 A | 6/1997 | Neto |
| 5,671,689 A | 9/1997 | Clapp et al. |
| 5,969,618 A | 10/1999 | Redmond |
| 5,992,218 A | 11/1999 | Tryba et al. |
| 6,384,611 B1 | 5/2002 | Wallace et al. |
| 6,386,237 B1 | 5/2002 | Chevalier et al. |
| 6,498,991 B1 | 12/2002 | Phelan et al. |
| 6,735,705 B1* | 5/2004 | Egbert et al. ................. 713/300 |
| 6,958,615 B2 | 10/2005 | Poulbot et al. |
| 7,555,936 B2 | 7/2009 | Deckard |
| 8,087,430 B1 | 1/2012 | Betz et al. |
| 8,183,872 B2 | 5/2012 | Stark |
| 8,217,669 B1* | 7/2012 | Watkins, Jr. ................. 324/693 |
| 8,515,687 B2 | 8/2013 | Pereira et al. |
| 8,829,929 B1* | 9/2014 | Watkins, Jr. ................. 324/693 |
| 8,997,792 B2 | 4/2015 | Betsinger et al. |
| 2001/0018845 A1 | 9/2001 | Roberts |
| 2002/0154029 A1 | 10/2002 | Watters et al. |
| 2003/0164048 A1 | 9/2003 | Shkel |
| 2004/0065377 A1 | 4/2004 | Whiteley |
| 2005/0253821 A1 | 11/2005 | Roeder |
| 2006/0226701 A1 | 10/2006 | Gatz et al. |
| 2007/0051166 A1 | 3/2007 | Baker et al. |
| 2007/0131035 A1 | 6/2007 | Krutz et al. |
| 2008/0036617 A1 | 2/2008 | Arms et al. |
| 2010/0007325 A1 | 1/2010 | Stark |
| 2010/0174495 A1 | 7/2010 | Pereira et al. |
| 2010/0308575 A1 | 12/2010 | Rodenburg |
| 2011/0152024 A1* | 6/2011 | Kuehl ........................... 474/166 |
| 2011/0226302 A1 | 9/2011 | Farmer et al. |
| 2011/0281488 A1 | 11/2011 | Li |
| 2012/0136592 A1 | 5/2012 | Pereira et al. |
| 2012/0204923 A1 | 8/2012 | Ortiz et al. |
| 2013/0134992 A1 | 5/2013 | Zhu et al. |
| 2014/0076449 A1 | 3/2014 | Betsinger et al. |
| 2014/0238109 A1 | 8/2014 | Wells et al. |
| 2014/0265561 A1 | 9/2014 | Beining |
| 2015/0177172 A1 | 6/2015 | Upasani et al. |
| 2015/0240972 A1 | 8/2015 | Betsinger |

FOREIGN PATENT DOCUMENTS

| | | |
|---|---|---|
| EP | 1126205 | 8/2001 |
| EP | 1 722 217 A1 | 11/2006 |
| EP | 2 261 546 A1 | 12/2010 |
| GB | 1574749 | 9/1980 |
| JP | 2011027216 | 2/2011 |
| WO | WO 03/079749 | 10/2003 |
| WO | WO 2008/001238 | 1/2008 |
| WO | WO 2008/059226 A2 | 5/2008 |
| WO | 2011143384 | 11/2011 |
| WO | WO 2012/012482 A1 | 1/2012 |
| WO | WO 2012/071424 | 5/2012 |
| WO | WO 2012/149161 | 11/2012 |

OTHER PUBLICATIONS

International Search Report for Application No. PCT/US2013/030966 mailed Aug. 1, 2013.

Invitation to Pay Additional Fees with Partial International Search for Application No. PCT/US2013/048660 mailed Mar. 24, 2014.

International Search Report and Written Opinion for Application No. PCT/US2013/048660 mailed Sep. 8, 2014.

Guo, Z. et al., "GRE: Graded Residual Energy Based Lifetime Prolonging Algorithm for Pipeline Monitoring Sensor", *9th International Conference on Parallel and Distributed Computing Applications and Technologies*, 203-210 (2008).

Mohamed, M. et al., "Power Harvesting for Smart Sensor Networks in Monitoring Water Distribution System", *International Conference on Networking, Sensing and Control*, 393-398 (2011).

Ok, C. et al., "Optimal Transmission Power in Self-sustainable Sensor Networks for Pipeline Monitoring", *IEEE International Conference on Automation Science and Engineering*, 591-596 (2007).

ISR & Written Opinion for PCT/US2011/061865 mailed May 21, 2012, 12 pages.

ISR & Written Opinion for PCT/US2014/017590 mailed Jun. 3, 2014, 11 pages.

ISR for PCT/IN2012/000296 mailed Nov. 27, 2012, 2 pages.

ISR for PCT/US2013/059465 mailed Dec. 3, 2013, 3 pages.

ISR & Written Opinion for PCT/US2013/059473 mailed Jul. 18, 2001, 15 pages.

Invitation to Pay Addt'l Fees w/Partial IS for PCT/US2013/059473 mailed Feb. 28, 2014, 6 pages.

ISR & Written Opinion for PCT/US2014/029286 mailed Jun. 18, 2014, 13 pages.

Holland et al., "Layered Polymer Whole Structure Health Monitoring Using Capacitance Sensing," 2010 IEEE/ASME International Conference on Advanced Intelligent Mechatronics, Jul. 6-9, 2010, 4 pages.

Radtke et al., Design of Power-Transmitting Hydraulic Hose with Integrated Controller Area Network and Life-Sensing Capability, 2005 Agricultural Equipment Technology Conference, Feb. 15, 2005.

Hewlett Packard Technical Manual, printed Apr. 24, 2003, 8 Pages.

European Search Report for Application No. 12875245.8 mailed Dec. 15, 2015.

* cited by examiner

DEGRADATION MONITORING SYSTEM FOR HOSE ASSEMBLY

CROSS-REFERENCE TO RELATED APPLICATIONS

The present application claims priority to U.S. Provisional Patent Application No. 61/480,924, filed Apr. 29, 2011, the disclosure of which is hereby incorporated by reference in its entirety.

BACKGROUND

High pressure reinforced hydraulic hose is typically used on a variety of fluid power operated machines, such as earth-moving machines, to provide a flexible connection between several moving parts of a hydraulic circuit employed on or within the machine. Such hoses may include a hollow polymeric inner tube on which successive cylindrical layers of reinforcing material, such as wire or textile, are concentrically applied to contain the radial and axial pressures developed within the inner tube.

Many applications are demanding hose constructions with both high burst strength and long term fatigue resistance. Using conventional technology, the burst strength of a hose design may be increased by adding additional reinforcing material and/or layers, a practice which is generally discouraged because of its negative impact on the flexibility of the hose, or by universally increasing the tensile strength of each layer of reinforcement material, which may come at the expense of hose fatigue resistance.

To determine the robustness of a hose design, a hose manufacturer typically performs, among other tests, an impulse test and a burst test on the hose. An impulse test measures a hose design's resistance to fatigue failure by cyclically subjecting the hose to hydraulic pressure. A burst test, on the other hand, is a destructive hydraulic test employed to determine the ultimate strength of a hose by uniformly increasing internal pressure until failure. Based on these and other tests, a manufacturer can estimate a hose life that can be used to determine when a hose has reached the end of its life and may require replacing.

In some circumstances, it is desirable to detect, in a non-destructive and non-disruptive manner a likelihood of failure of a hydraulic hose. One solution providing this capability is discussed in U.S. Pat. No. 7,555,936, and discloses connecting a monitor circuit between two parallel, at least partially-conductive layers of a hose wall. A change in an electrical property observed by that monitor circuit may indicate a change in a property of the hose wall structure that might indicate impending failure of the hose wall. However, even with this solution, it can be difficult to determine whether the changed electrical property is in fact due to a change in a physical feature of a hose wall, or if the changed electrical property is due to a change in the sensing electronics, a change in an electrical property of a harness connecting the monitoring circuit to the hose wall, or simply degradation of an electrical connection to the hose wall. In these cases, there may be a change in an electrical property observed, even when hose wall integrity is not compromised.

SUMMARY

An aspect of the present disclosure relates to a hose degradation monitoring system. The system includes a hose assembly including a hose having a first conductive layer and a second conductive layer, and a monitoring circuit in electrical communication with the first and second conductive layers. The degradation monitoring circuit includes a circuit element having a non-linear electrical property in response to changed voltage.

A second aspect of the present disclosure relates to a method of monitoring degradation of a hose assembly. The method includes applying a first voltage across a circuit element connected between first and second conductive layers of a hose assembly, and concurrently detecting a first electrical characteristic of the circuit element. The method further includes applying a second voltage across the circuit element, the second voltage different from the first voltage, and concurrently detecting a second electrical characteristic of the circuit element. The method also includes calculating an electrical characteristic of the hose assembly based at least in part on the first and second electrical characteristics.

A third aspect of the present disclosure relates to a hose degradation monitoring system that includes a hose assembly, a monitoring circuit, and a monitoring assembly. The hose assembly includes a first conductive layer and a second conductive layer, and the monitoring circuit includes a diode electrically connected between the first conductive layer and the second conductive layer. The diode has a resistance that changes non-linearly as a function of voltage applied across the diode. The monitoring assembly includes a housing and a circuit board, with the circuit board positioned in a channel of the housing and including electrical contacts oriented toward the hose assembly. The electrical contacts electrically connect the monitoring circuit to the first and second conductive layers.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
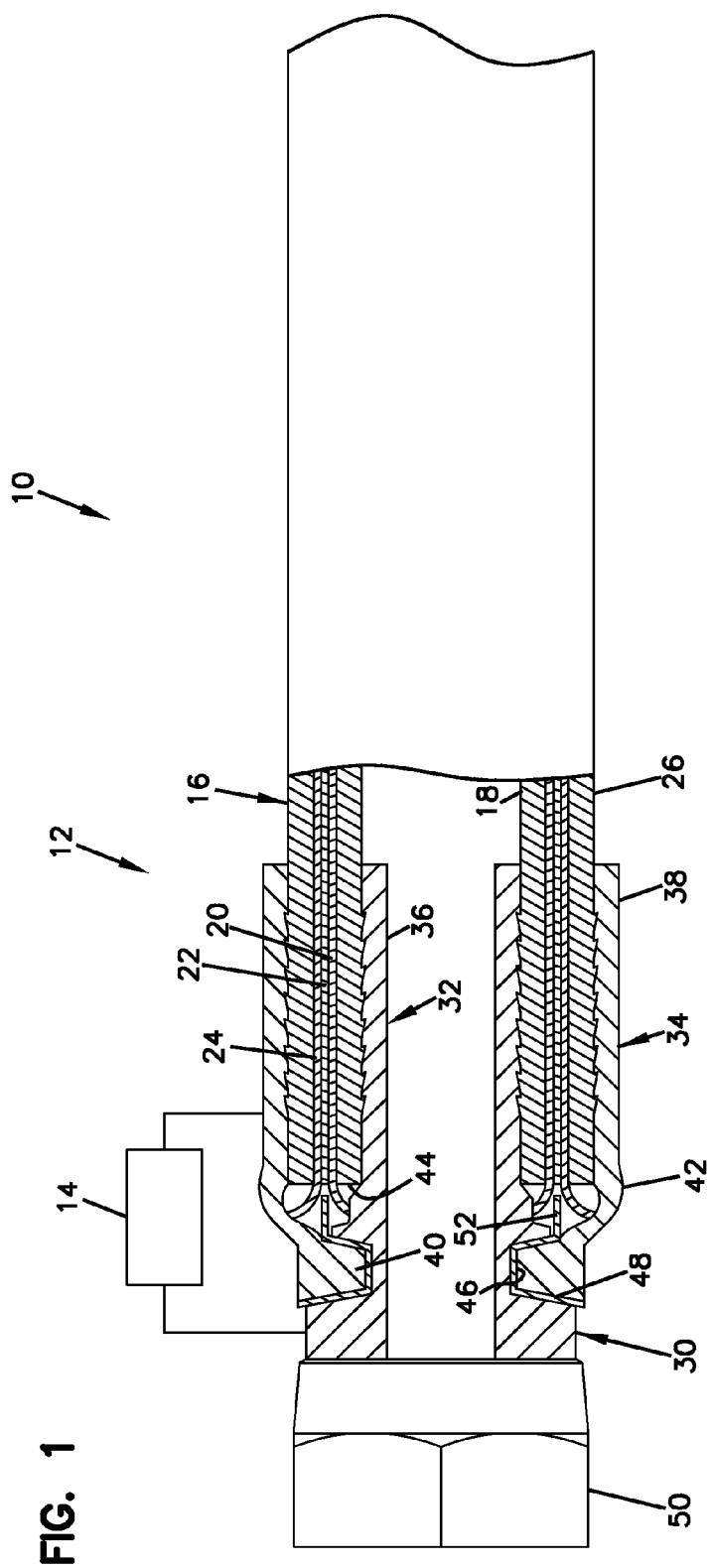
FIG. 1 is a partial cross-sectional view of an exemplary hose assembly employing a fault detector having exemplary features of aspects in accordance with the principles of the present disclosure.

Referring now to FIG. 1, an exemplary hose fault detection system, generally designated 10, is shown. The hose fault detection system 10 includes a hose assembly, generally designated 12, and a monitoring assembly 14 in electrical and physical communication with the hose assembly 12.

The hose assembly 12 includes a hose, generally designated 16, having a multi-layer construction. In the subject embodiment, the hose 16 is generally flexible and includes an inner tube 18 made from a polymeric material, such as rubber or plastic, or another material depending on the requirements of the particular application, a first conductive layer 20, an intermediate layer 22, a second conductive layer 24 and an outer cover 26. The first and second conductive layers 20, 24 define an electrical characteristic of the hose assembly 12, such as resistance.

In the subject embodiment, the first conductive layer 20 overlays the inner tube 18 and the intermediate layer 22 overlays the first conductive layer 20. The second conductive layer 24 overlays the intermediate layer 22. The first and second conductive layers 20, 24 may be configured as reinforcing layers. The outer cover 26 may overlay the second conductive layer 24, and may include, for example, an extruded layer of rubber or plastic. The outer cover 26 may itself include a reinforcing layer.

The intermediate layer 22 operates to at least partially insulate electrically the first and second conductive layers 20, 24 from one another. The intermediate layer 22 may have any of a variety of constructions. For example, the intermediate layer 22 may consist of a single layer of an electrically resistive material. The intermediate layer 22 may also consist of multiple layers, wherein at least one of the layers exhibits electrical insulating properties. Certain composite materials may also be employed in the intermediate layer 22, such as a woven fabric bonded to a polymeric material. Composite materials having various other constructions may also be utilized. Composite materials may also be used in combination with other materials to form the intermediate layer 22.

The first and second conductive layers 20, 24 generally extend the entire length and span the entire circumference of the hose. This is generally the case when the conductive layer also functions as a reinforcement layer. The intermediate layer 22 may also extend over the entire length and circumference of the hose. There may be instances, however, where at least one of the first and second conductive layers 20, 24 extends only over a portion of the hose length and/or a portion of its circumference. In that instance, the intermediate layer 22 may also be configured to generally extend over the region of the hose containing the partial conductive layer 20, 24. The partial intermediate layer 22 may be positioned within the hose so as to separate the first and second conductive layers 20, 24 from one another.

Figure 2:
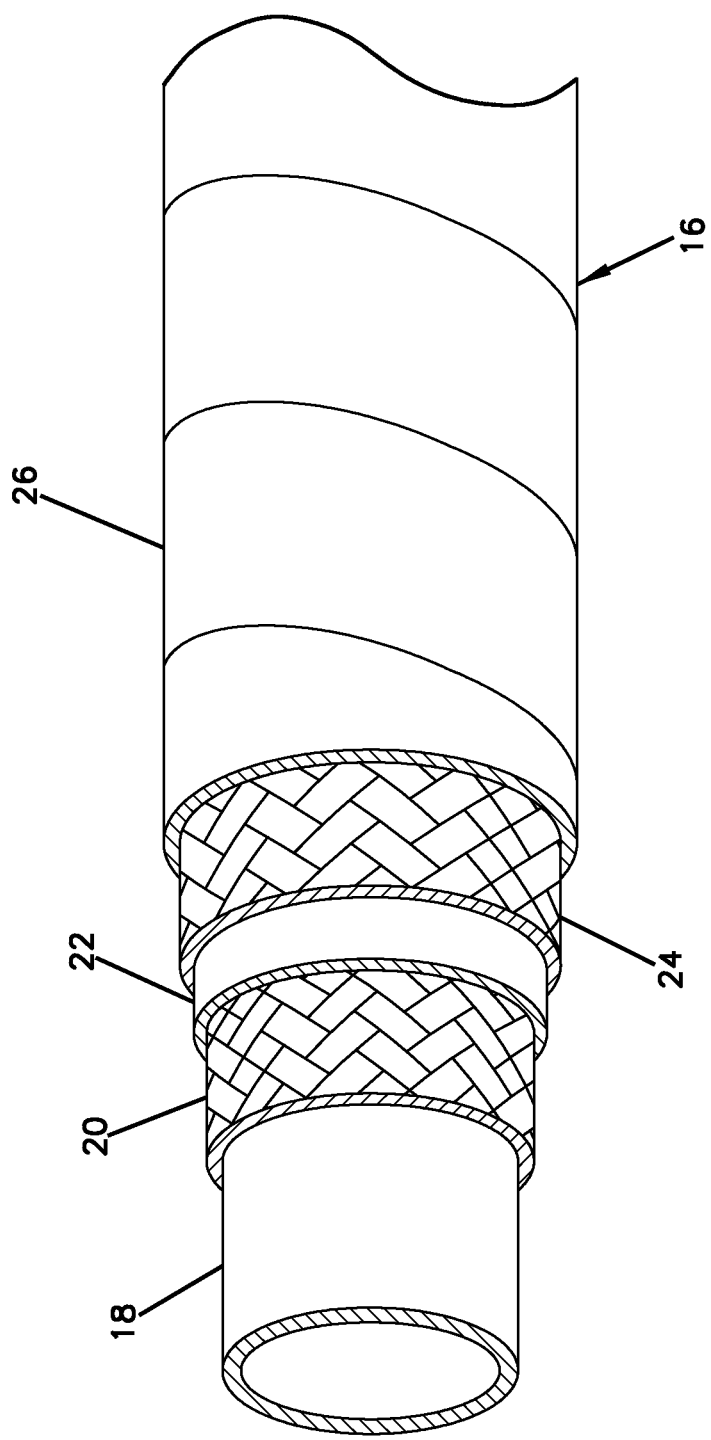
FIG. 2 is a perspective view, partially cut away, illustrating an exemplary hose employing a braided conductive layer that is suitable for use with the hose assembly of FIG. 1.
Figure 3:
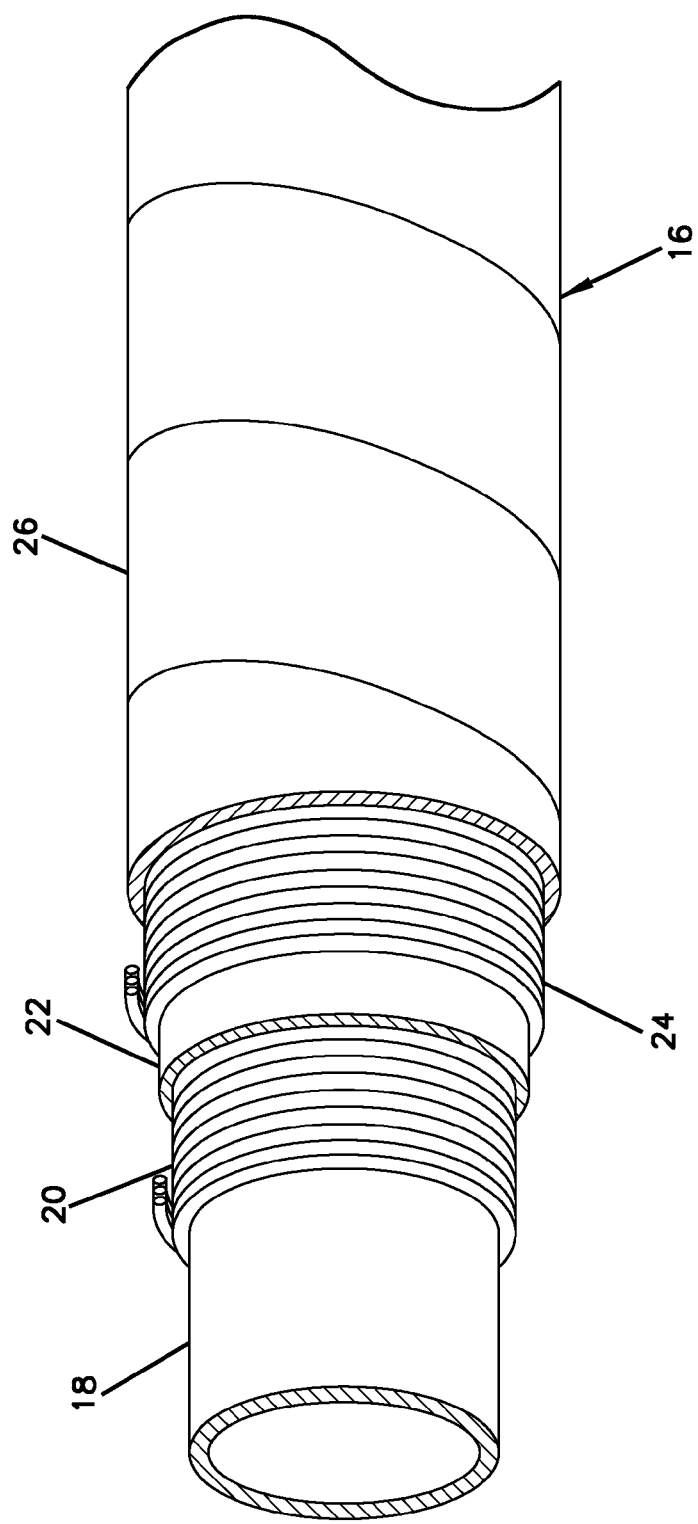
FIG. 3 is a perspective view, partially cut away, illustrating an exemplary hose employing a spiral wire conducting layer that is suitable for use with the hose assembly of FIG. 1.
Figure 4:
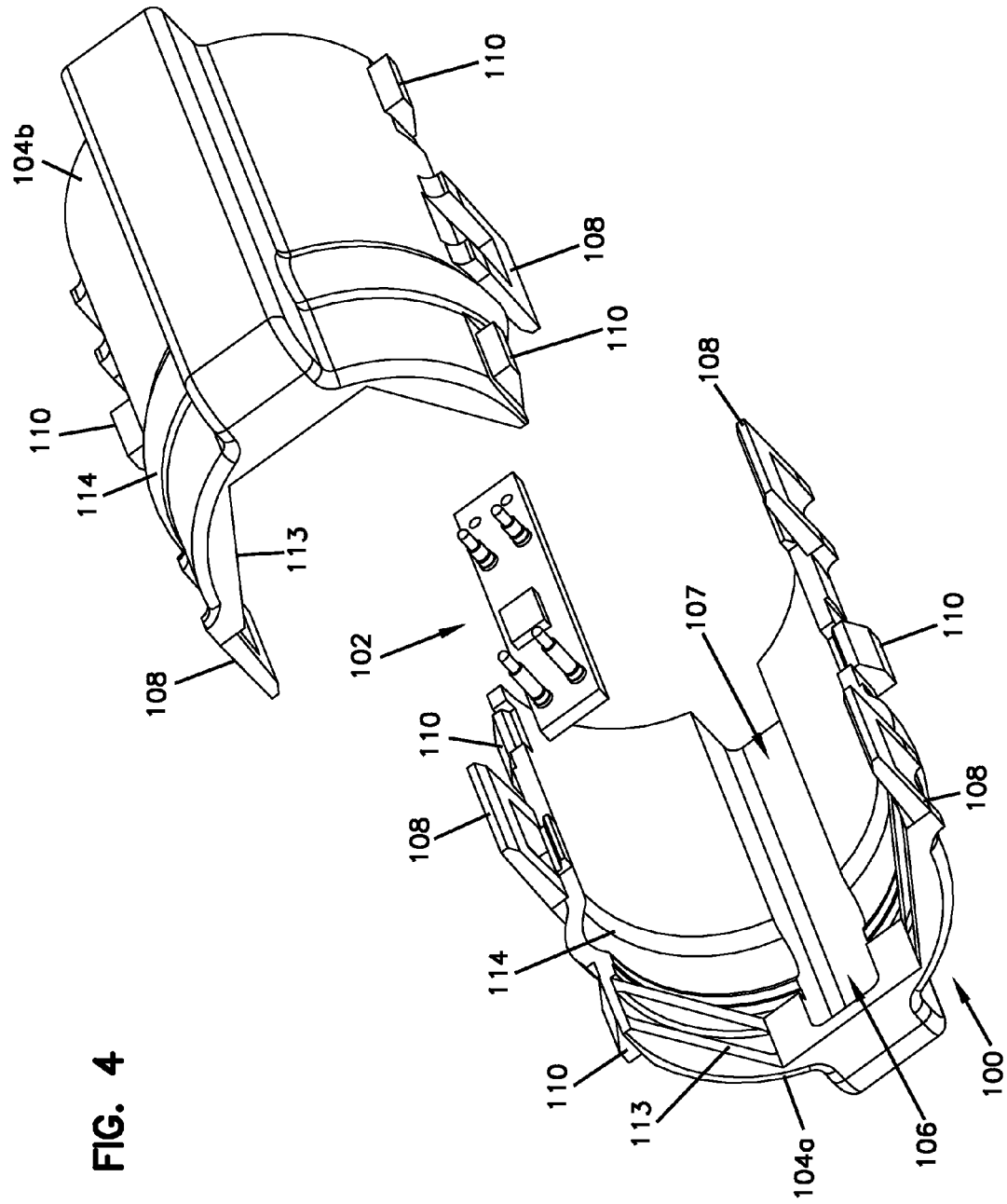
FIG. 4 is an exploded perspective view of a monitoring assembly installable on a portion of a hose illustrated in FIG. 1.
Figure 5:
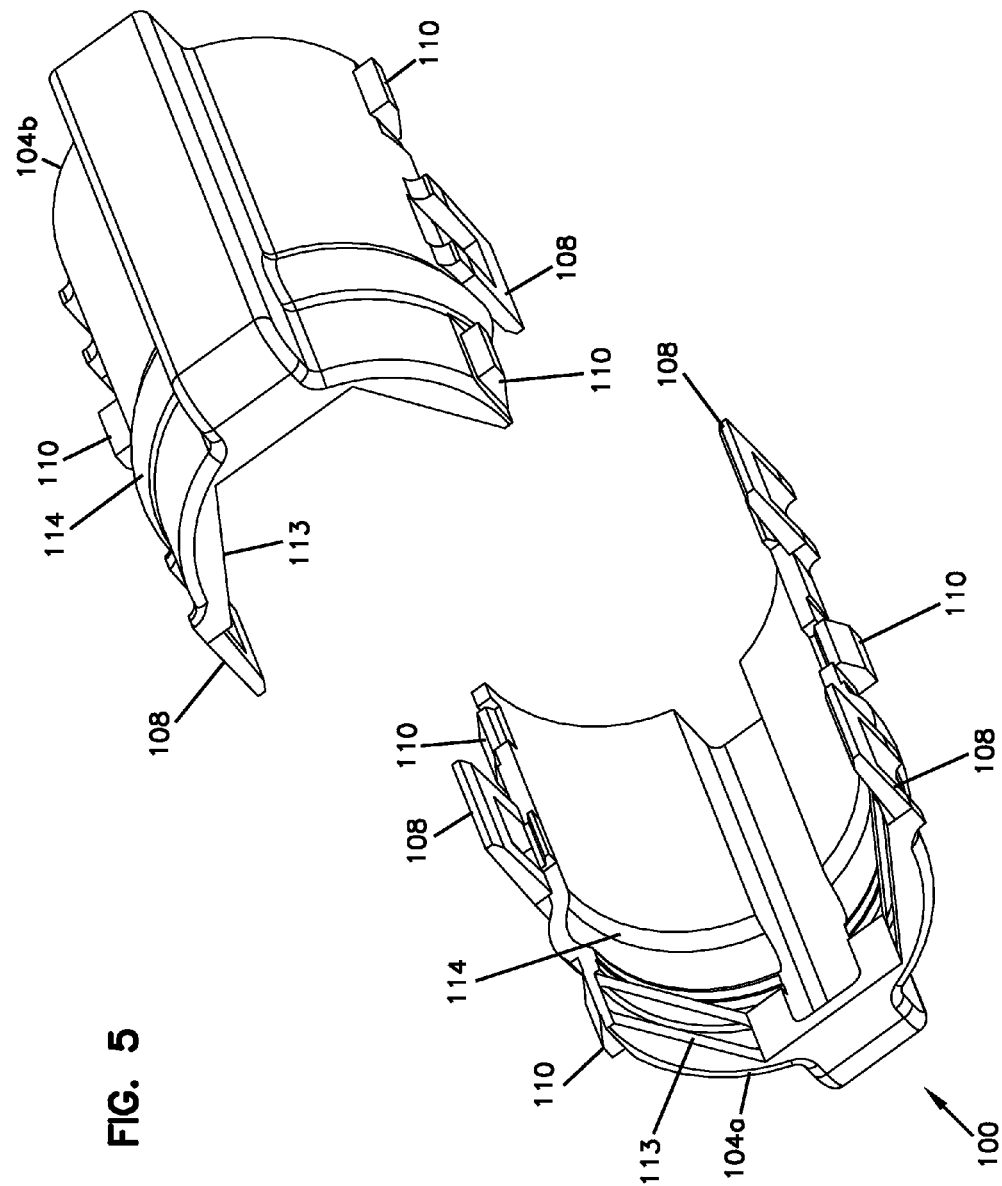
FIG. 5 is an exploded perspective view of a housing forming a portion of the monitoring assembly of FIG. 4.
Figure 6:
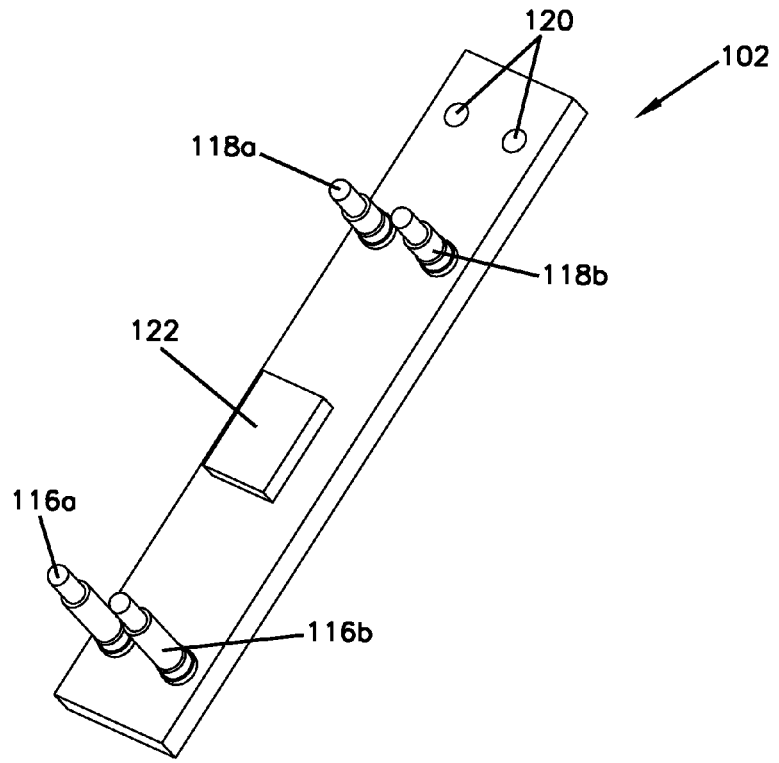
FIG. 6 is a perspective view of a circuit board encased by the housing of FIG. 5.
Figure 7:
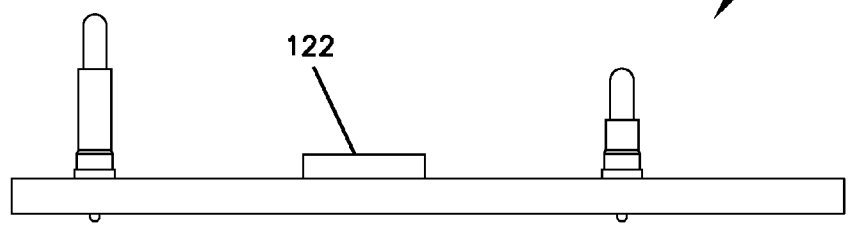
FIG. 7 is a side plan view of the circuit board of FIG. 6.
Figure 8:
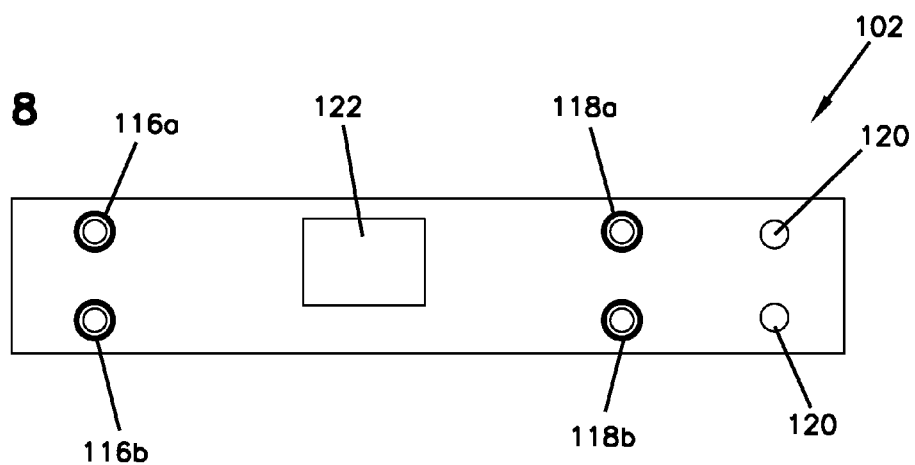
FIG. 8 is a top plan view of the circuit board of FIG. 6.
Figure 9:
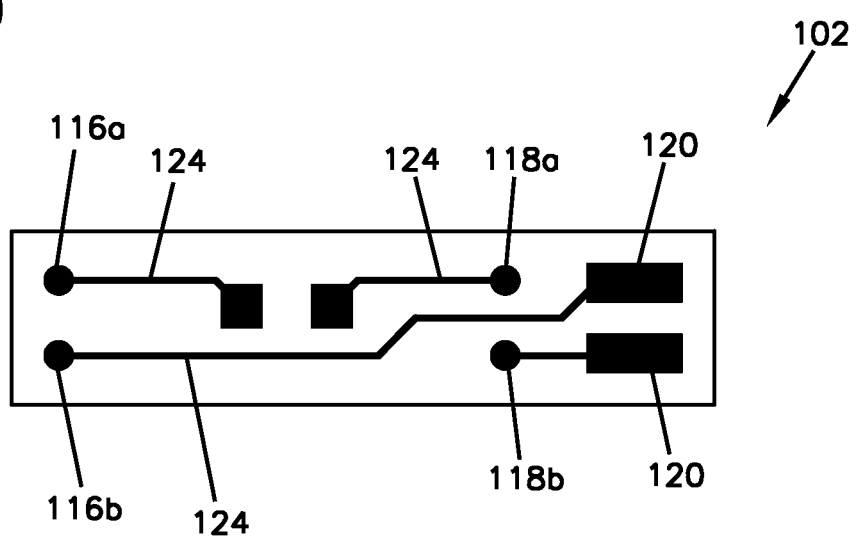
FIG. 9 is a schematic trace view of the circuit board of FIG. 6.

Referring now to FIGS. 2 and 3, the first and second conductive layers 20, 24 may include, for example, an electrically conductive braided reinforcement material, such as shown in FIG. 2, or alternating layers of electrically conductive spiral reinforcement material, such as shown in FIG. 3. The braided reinforcement material may consist of a single layer or may include multiple layers. Although a two-wire spiral reinforcement arrangement is depicted in FIG. 3, it shall also be appreciated that other configurations, such as four and six wire arrangements, may also be utilized.

The first and second conductive layers 20, 24 may each have the same configuration, or each layer may be configured differently. For example, the first and second conductive layers 20, 24 may each include the braided material shown in FIG. 2, or one of the first and second conductive layers 20, 24 may include the braided material while the other of the first and second conductive layers 20, 24 may include the spiral reinforcement material shown in FIG. 3. Additionally, the first and second conductive layers 20, 24 may include a single ply or multiple plies of reinforcement material. The first and second conductive layers 20, 24 may comprise metal wire, natural or synthetic fibers and textiles, and other reinforcement materials, provided the selected material is electrically conductive.

Referring again to FIG. 1, the hose assembly 12 may include a hose fitting, generally designated 30, for fluidly coupling the hose 16 to another component. The hose fitting 30 may have any of a variety of different configurations depending, at least in part, on the requirements of the particular application.

In the subject embodiment, the hose fitting 30 includes a nipple, generally designated 32, that engages the inside of the hose 16 and a socket, generally designated 34, that engages the outside of the hose 16. The nipple 32 includes an elongated cylindrical end portion 36 that engages the inner tube 18 of the hose 16. A cylindrically shaped end portion 38 of the socket 34 engages the outer cover of the hose 16. The socket 34 and nipple 32 may be constructed from an electrically conductive material.

The socket 34 and nipple 32 can be secured to the hose 16 by crimping the end portion 38 of the socket 34 overlaying the hose 16. The crimping process deforms the end portion 38 of the socket 34, thereby compressing the hose 16 between the nipple 32 and the socket 34. In the subject embodiment, the portions of the nipple 32 and the socket 34 that engage the hose 16 include a series of serrations that at least partially embed into the relatively softer hose material when the socket 34 is crimped to help secure the hose fitting 30 to the hose 16. The serrations may be configured to prevent the serrations from penetrating the inner tube and outer cover and contacting the first and second conductive layers 20, 24.

In the subject embodiment, the socket 34 includes an inwardly extending circumferential lug 40 positioned near an end 42 of the socket 34 adjacent an end 44 of the hose 16. The lug 40 engages a corresponding circumferential slot 46 formed in the nipple 32 for securing the socket 34 to the nipple 32. The end 42 of the socket 34 having the lug 40 is initially formed larger than the nipple 32 to enable the socket 34 to be assembled onto the nipple 32. During the assembly process the end 42 of the socket 34 is crimped, which deforms the socket 34 and forces the lug 40 into engagement with the corresponding slot 46 in the nipple 32. The socket 34 can be electrically insulated from the nipple 32 by positioning an electrically insulating collar 48 between the socket 34 and nipple 32 at the point the lug 40 engages the slot 46.

The hose fitting 30 also includes a nut 50 rotatably attached to the nipple 32. The nut 50 provides a means for securing the hose assembly 12 to another component.

The first conductive layer 20 may be configured to extend beyond the end of the inner tube of the hose 16. The first conductive layer 20 may engage the nipple 32 to create an electrical connection between the nipple 32 and the first conductive layer 20. Similarly, the second conductive layer 24 may be configured to extend beyond an end of the outer cover of the hose 16. The second conductive layer 24 may engage the socket 34 to create an electrical connection between the socket 34 and the second conductive layer 24.

To help prevent the portions of the first and second conductive layers 20, 24 that extend beyond the end of the hose 16 from contacting one another, an electrically insulating spacer 52 may be positioned between the exposed ends of the first and second conductive layers 20, 24. The spacer 52 may be integrally formed as part of the collar 48 used to electrically insulate the socket 34 from the nipple 32. The spacer 52 may also be formed by extending the intermediate layer 22 of the hose 16 beyond an end of the inner tube 18 and outer cover 26. The spacer 52 may also be configured as a stand alone component separate from the collar 48 and the intermediate layer 22 of the hose 16.

The monitoring assembly 14 may have any of a variety of configurations. In general, the monitoring assembly 14 is connectable over a portion of the hose assembly 12, in particular the portion illustrated in FIG. 1. The monitoring assembly 14, when installed over hose assembly 12, forms a physical and electrical connection with the hose assembly 12, and in particular to nipple 32 and socket 34, respectively. Generally, the monitoring assembly 14 detects an electrical characteristic of the hose assembly 12, while validating the connection to the nipple 32 and socket 34. An exemplary monitoring assembly 14 is described in further detail below, in connection with FIGS. 4-11.

Referring now to FIGS. 4-9, additional structural details of an example monitoring assembly 14 installable on a portion of the hose assembly 12 are shown. The monitoring assembly includes housing 100 and a circuit board 102.

In the embodiment shown, the housing 100 includes first and second shell pieces 104a-b which are shaped to be joined together to form the generally hollow cylindrical housing 100, which is sized and positioned to enclose an end portion of the hose assembly 12. The housing 100 includes a channel 106 within at least one of the shell pieces 104a-b within which the circuit board can be seated and positioned to engage the hose assembly 12. In some embodiments, the channel 106 has an open end 107, allowing wire leads to enter the housing 100 and connect to the circuit board 102.

The shell pieces 104a-b include complementary snap-fit connectors 108, 110 positioned on opposed mating edges 112 of the shell pieces, such that the shell pieces 104a-b can be disengageably interconnected. In alternative embodiments, the housing 100 can be constructed from one or more shell pieces, and can be constructed to be either disengageable or sealed around the hose assembly 12. In some embodiments, the shell pieces can be formed from plastic, and are weather resistant to protect the circuit board 100.

When the shell pieces 104a-b are joined, the housing 100 forms a generally hexagonal inner surface 113 along one end that is complementary to the nut 50. Additionally, a band 114 is formed circumferentially along the housing 100 over the end 42 of the socket 34. The band 114 prevents the housing from sliding off the hose assembly 12 in the direction of the nut 50, or down along the length of the hose 16. Additionally, because in this embodiment the nut 50 has a diameter generally smaller than the hose 16, the housing 100 will not slide down the length of the hose 16.

Referring now specifically to FIGS. 6-9, the circuit board 102 includes two pairs of contacts 116a-b, 118a-b, and a circuit element 122. In the embodiment shown, the circuit element 122 is a diode, additional details of which are discussed below in connection with FIGS. 10-13. The circuit board 102 is positioned within the channel 106 of the housing 100, such that a front face (i.e., a side of the circuit board including the contacts 116a-b, 118a-b and circuit element 122) of the circuit board is oriented toward the hose assembly 12.

Figure 11:
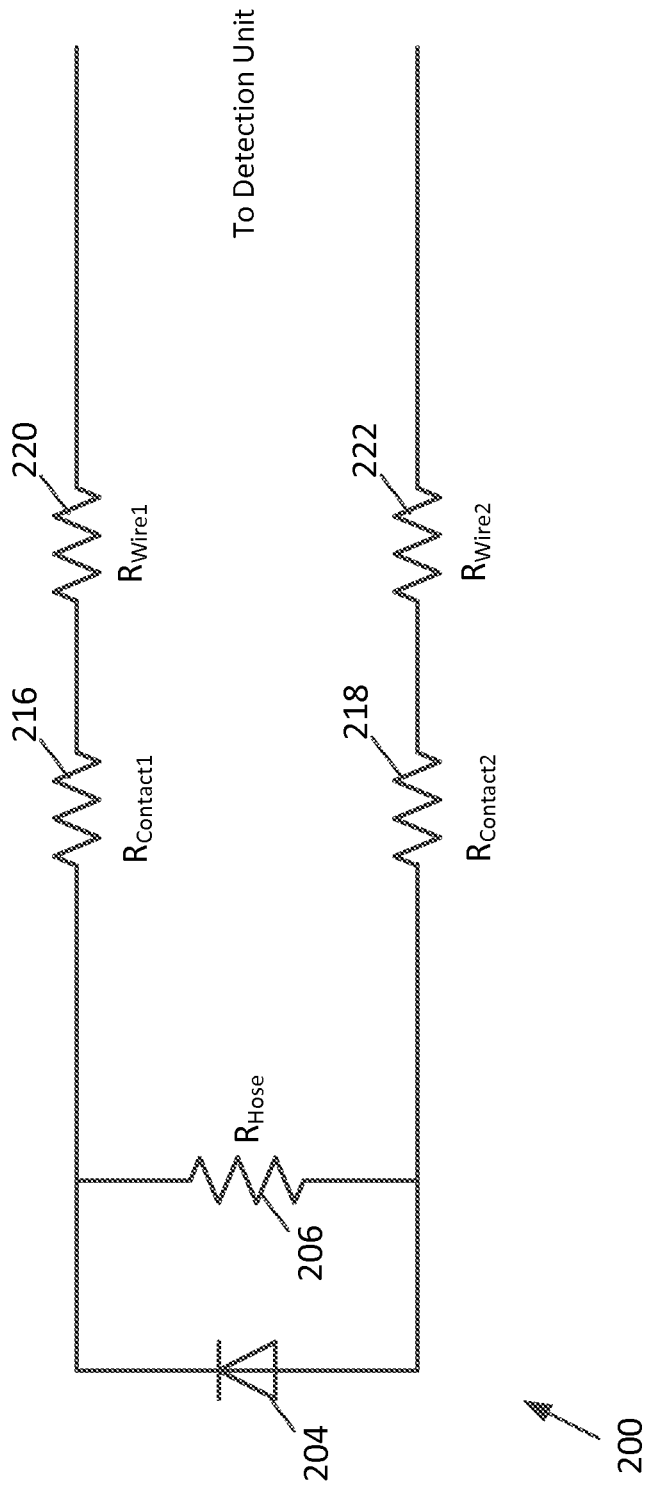
FIG. 11 is a logical circuit representation of components of an integrated monitoring assembly and hose assembly of FIG. 10.
Figure 12:
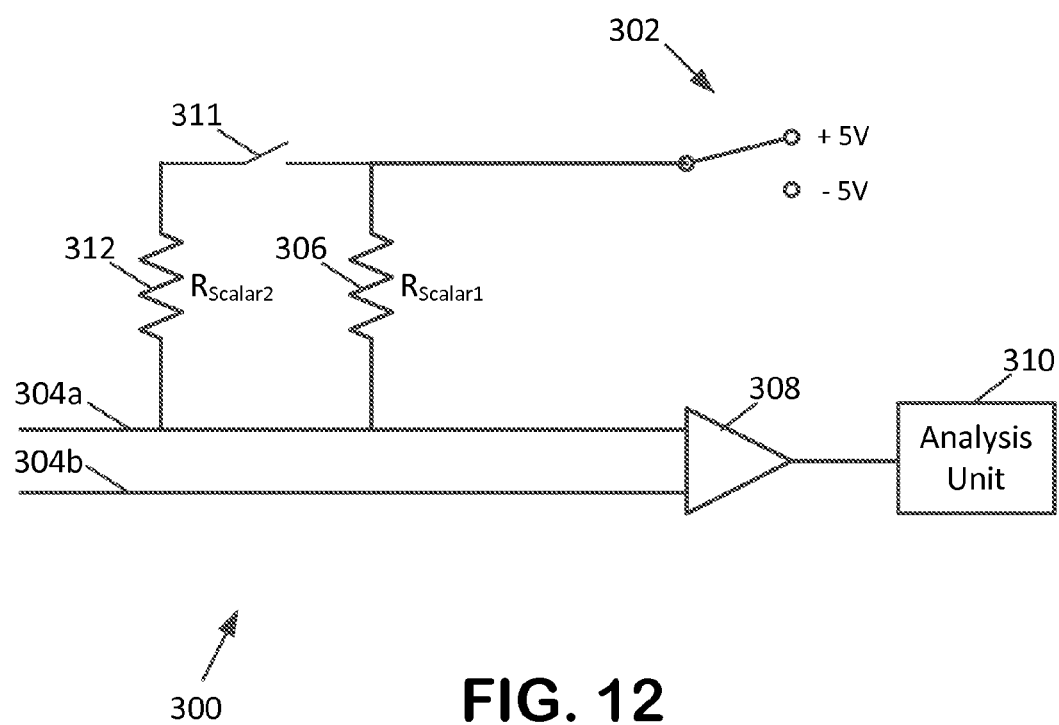
FIG. 12 is a schematic view of a diagnostic unit useable in conjunction with the monitoring assembly of FIGS. 4-9.

In the embodiment shown, when positioned within the channel 106 the first pair of contacts 116a-b are each positioned to electrically connect to nipple 32, and the second pair of contacts 118a-b are positioned to electrically connect to socket 34. Wire connection pads 120 are connected to the first and second pair of contacts 116a-b, 118a-b, respectively, as well as a circuit element 122, via circuit board tracks 124, to form the circuit illustrated in FIGS. 10-11, below. Wire connection pads 120 can receive soldered or otherwise electrically bonded connections to wires leading to a diagnostic unit, an example of which is illustrated in FIG. 12.

Figure 10:
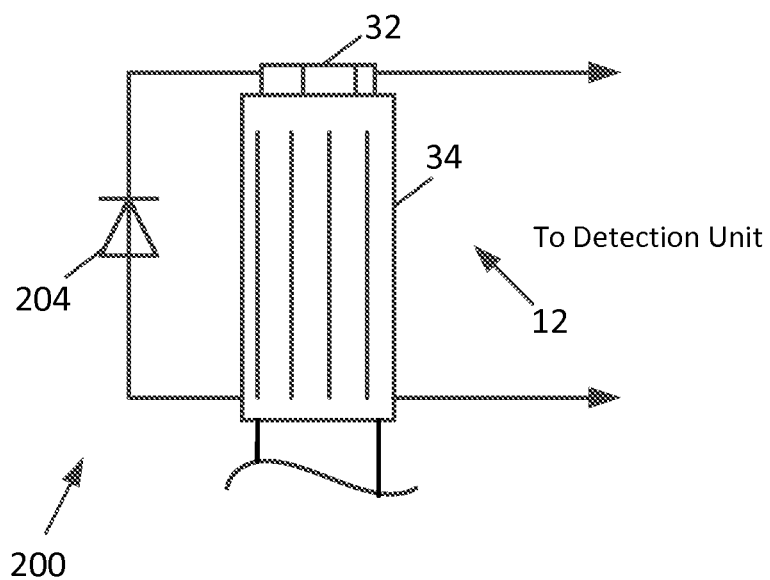
FIG. 10 is a generalized schematic view of a monitoring circuit included in the monitoring assembly of FIGS. 4-10, as integrated with the hose assembly of FIGS. 1-3.

FIG. 10 illustrates a general schematic view of a circuit 200 formed with the hose assembly 12 to monitor its degradation. The circuit 200 includes a monitoring circuit 202, which can be, in some embodiments, positioned on the circuit board 102 of FIGS. 4 and 6-9. The monitoring circuit 202 includes a circuit element, illustrated as diode 204, connected between the socket 34 and the nipple 32, thereby connecting the diode between the first and second conductive layers 20, 24 of the hose 16. Although in this embodiment a diode is shown, it is recognized that any circuit element could be used, if it has a non-linear electrical property which includes a non or low conducting state in response to changed voltage.

In use, the monitoring circuit 202 can be used to detect an electrical property of the hose, for example a resistance of the hose. Although this could otherwise be tested by applying a voltage directly across the nipple 32 and socket 34, that arrangement would be subject to false readings, because it would obtain a false failure signal in case of a failed connection between the voltage source and the hose assembly 12 occurring at the electrical contacts 116a-b, 118a-b. Accordingly, use of two or more readings at different voltage levels for conducting and non-conducting states of a circuit element 204 allows for verification that open-circuit conditions are not the cause of a particular reading.

In general, it is noted that although the circuit 202 is intended to monitor an electrical property of the first and second conductive layers 20, 24, additional features of the hose assembly 12 and monitoring assembly 14 contribute to overall measurements made by a diagnostic unit. FIG. 11 illustrates a schematic representation of the overall circuit 200, including the various resistive effects introduced by the hose assembly 12 and monitoring assembly 14. In this illustration, the diode 204 is connected in parallel across the hose assembly 12, which is represented by a hose resistance 206 ($R_{Hose}$).

Additional resistances within the circuit 200 exist as well, and are accounted for in the schematic view depicted in FIG. 11. These include resistance caused when the contacts 116a-b, 118a-b are electrically connected to the socket 34 and nipple 32. These resistances are represented by contact resistances 216, 218 ($R_{Contact1}$, $R_{Contact2}$, respectively). Additionally, resistance for the wires leading to a diagnostic unit are depicted as resistances 220, 222 ($R_{Wire1}$, $R_{Wire2}$), since monitoring of the circuit response will typically occur at the diagnostic unit.

In general, contact and wire resistances in hose assembly and monitoring assembly are assumed to be constant during the time and for the conditions in which hose resistance is calculated. If the voltage/current characteristics of the circuit element (e.g., diode) are known, then the remaining unknown circuit values are the hose resistance 206 ($R_{Hose}$), and a total resistance in the circuit 200. To obtain those two values, two measurements can be performed to obtain readings from which the unknown values can be derived. In some embodiments, a first measurement occurs when the diode 204 is in a conducting (e.g., forward-biased) state, and a second measurement occurs when the diode 204 is in a non-conducting (e.g., reverse-biased) state.

Although in the embodiments discussed herein the diode is positioned at a connectorized end of a hose assembly, it is recognized that the diode and/or contacts could be located elsewhere along the hose, such as at an opposite end of the hose assembly. Additionally, although in the embodiment discussed herein it is noted that hose resistances are considered, a capacitive effect of the hose could be considered as well, alongside a nominal contamination resistance present due to noise from the contact assembly.

Referring now to FIG. 12, a schematic view of a diagnostic unit 300 is shown. The diagnostic unit 300 can be used, for example to apply a stimulus to the circuit 200 of FIGS. 10-11, and to derive an electrical characteristic for the hose assembly 12. By taking repeated measurements of such an electrical characteristic, changes over time can indicate degradation of the hose 16 within the hose assembly 12.

In the embodiment shown, the diagnostic unit includes a switching voltage source 302 connected to a first wire 304a of a pair of wires 304a-b via a resistor 306 ($R_{Scalar1}$). In the embodiment shown, the switching voltage source 302 is capable of providing a +5V or −5V signal onto wires 304a-b, by selectively applying a 5V source to one or the other of wires 304a-b. However, in other embodiments, the switching voltage source 302 can include additional switches and/or voltage levels or voltage dividers. In the example shown, an additional resistor 312 ($R_{Scalar2}$) is selectively incorporated into the circuit of the diagnostic unit 300 using a voltage divider switch 311 to provide positive and negative voltages of multiple levels onto wires 304a-b.

The pair of wires 304a-b lead from the diagnostic unit 300 to the circuit 200, and can for example represent an opposite end of the wires extending to the diagnostic unit illustrated in FIGS. 10-11. In some embodiments, the pair of wires 304a-b lead from a location of the hose assembly 12 to a control panel, such as a panel within a cab of a vehicle on which the hose assembly 12 is installed. Other routing arrangements for the pair of wires 304a-b are possible as well.

The diagnostic unit 300 also includes a voltage sensor 308 connected to an analysis unit 310. The voltage sensor 308 is connected across the pair of wires 304a-b, and an output indicating a current level within the circuit is passed to the analysis unit 310 to perform one or more calculations to determine an electrical characteristic for the hose assembly 12. The analysis unit 310 can take any of a number of forms. In some embodiments, the analysis unit 310 is a programmable circuit configured to execute program instructions. Embodiments of the analysis unit 310 can be practiced in various types of electrical circuits comprising discrete electronic elements, packaged or integrated electronic chips containing logic gates, a circuit utilizing a microprocessor, or on a single chip containing electronic elements or microprocessors. In addition, aspects of the analysis unit 310, such as the calculations discussed herein, can be practiced within a general purpose computer or in any other circuits or systems.

In the embodiment shown, and using the switching voltage source 302, and/or switched scalar resistors 306, 312 (using voltage divider switch 311), voltage sensor 308, and analysis unit 310, two or more measurements can be taken in a circuit such as circuit 200 of FIGS. 10-11. These measurements can be taken using voltages having opposite polarities (e.g., using the switching voltage source 302) or having different voltages of the same polarity (e.g., using voltage divider switch 311 with resistors 306, 312). For example, a first measurement can be a measurement of voltage (e.g., the output of voltage sensor 308) with a first voltage having a magnitude and polarity for forward biasing the diode. The second measurement can be a measurement of current at the voltage sensor 308 with a voltage magnitude and polarity for reverse-biasing the diode. Typically, the second measurement can simply be a measurement using a voltage of negative polarity to that used for the first measurement, e.g., using the switching voltage source. Alternatively, if the diode is replaced with another device or circuit having a non-conducting state with a forward voltage level, then a voltage of positive polarity can be used for the second measurement. These measurements can be used to derive an electrical characteristic, for example resistance, of a circuit 200, from which a hose resistance 206 ($R_{Hose}$) and contact resistance 210 ($R_{Contact}$) can be derived.

In some embodiments in which more accurate resistances are required, a third measurement can also be taken, which will allow the characteristics of the diode to be better calculated. For example, the third measurement can be a measurement at a polarity for forward-biasing the diode, but at a scalar resistance or voltage different from the voltage used for the first measurement (e.g., using a voltage divider circuit including switched scalar resistor 312 and voltage divider switch 311). Additional details regarding the particular calculations capable of being performed using the analysis unit are discussed below in connection with FIG. 13.

Figure 13:
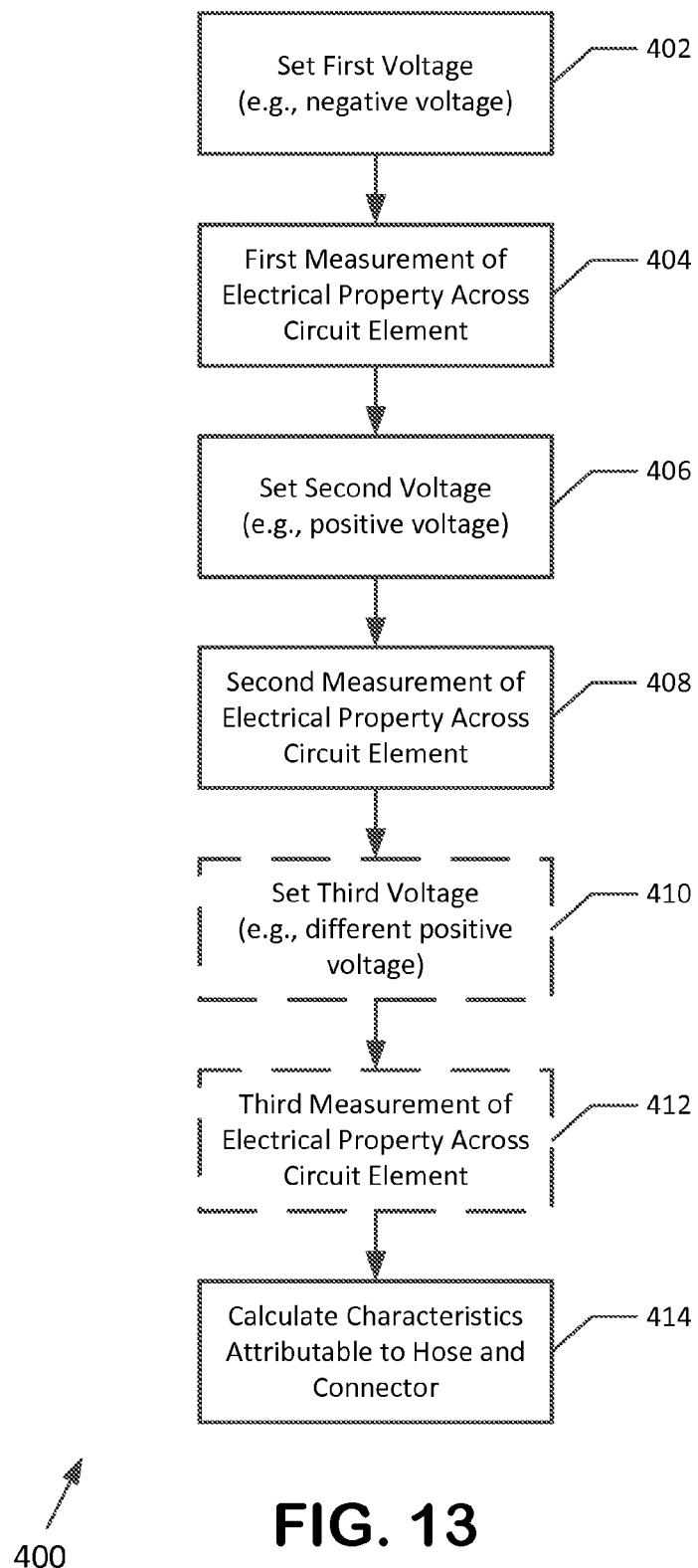
FIG. 13 is a representation of a method for monitoring the structural integrity of the hose assembly of FIG. 1.

FIG. 13 is a representation of a method 400 for monitoring the structural integrity of the hose assembly of FIG. 1. The method 400 illustrates an example method for measuring an electrical characteristic of a hose assembly 12 using a circuit element having a non-linear response to voltage and/or current. In some embodiments, and in the illustrated example measurements discussed herein, the method 400 can be used in a circuit having a diode (e.g., diode 204) connected across the nipple 32 and socket 34, thereby connecting the diode between the first and second conductive layers 20, 24.

According to the embodiment shown, a first electrical signal (e.g., voltage or current) can be applied across the circuit element (step 402). In some embodiments, the first electrical signal can be generated from a switching voltage source 302, and can be configured such that the diode is reverse-biased, e.g., an application of approximately −5 V. A first electrical property of the hose assembly and monitoring assembly (e.g., the collective circuit illustrated in FIGS. 10-11) can be determined (step 404) while the first electrical signal is applied. The first electrical property can be, for example, based on an observed voltage, using voltage sensor 308 of FIG. 12. In the example of circuit 200, above, when the diode is reverse-biased, the observed voltage will allow observation of an electrical characteristic total resistance based on the contact and wire resistances, as well as the hose resistance 206 ($R_{Hose}$). This is because the diode will approximate an open circuit if connections are made properly to the hose assembly 12. This first total resistance ($R_{T1}$) can be represented by the following equation:

$$R_{T1} = R_C + R_H$$

A second measurement can be performed by applying a second electrical signal across the circuit element (step 406) such that the diode is forward-biased. In this arrangement, the electrical property of the hose assembly and monitoring assembly can again be determined while this second electrical signal is applied (step 408). In the example circuit 200 including the diode 204, because that diode has a non-linear relationship with respect to applied voltage, current will pass through the diode and the diode will approximate a closed circuit having some resistance component ($R_{D2}$) given the diode characteristic of diode forward voltage ($V_{D2}$) at diode current ($I_{D2}$). The resistance of the diode in this arrangement can be represented by the following equation, where $I_{T2}$ is the total current:

$$R_{D2} = \frac{V_{D2}}{I_{D2}} = \frac{V_{D2}}{I_{T2} - \frac{V_{D2}}{R_H}}$$

The current through the diode 204 can be calculated using a current divider equation, with a portion of current passing through the diode and a portion passing through the hose resistance ($R_{Hose}$). This current is represented by the equation:

$$I_{D2} = I_{T2} - \frac{V_{D2}}{R_H}$$

Accordingly, resistance component ($R_{D2}$) can be expressed as:

$$R_{D2} = \frac{V_{D2}}{I_{D2}} = \frac{V_{D2}}{I_{T2} - \frac{V_{D2}}{R_H}}$$

A second total resistance ($R_{T2}$) of the circuit will be a combination of the contact resistance with the parallel hose and diode resistances, represented as follows:

$$R_{T2} = R_C + \frac{R_H \times R_{D2}}{R_H + R_{D2}}$$

Because the total current ($I_{T1}$ and $I_{T2}$) through the circuit 200 can be calculated by the analysis unit 310 as (voltage 302 minus voltage sensor 308) divided by scalar resistance 306 and/or 312, the first and second total resistance ($R_{T1}$ and $R_{T2}$) can be calculated as voltage sensor 308 divided by total current ($I_{T1}$ and $I_{T2}$).

Following determination of the electrical characteristics of the overall circuit, the analysis unit 310 can calculate an electrical characteristic attributable to the hose assembly 12 (step 414). In the example above in which two measurements are made, a hose resistance can be determined by subtracting the second total resistance ($R_{T2}$) (in which the diode acted as a resistor in parallel with the hose resistance) from the first total resistance (in which the diode acted as an open circuit), according to the following equation:

$$R_{T1} - R_{T2} = R_H - \frac{R_H \times R_{D2}}{R_H + R_{D2}} = R_H - \frac{R_H \times \frac{V_{D2}}{I_{T2} - \frac{V_{D2}}{R_H}}}{R_H + \frac{V_{D2}}{I_{T2} - \frac{V_{D2}}{R_H}}}$$

Solving for the hose resistance 206 ($R_{Hose}$) results in the following equation:

$$R_H = R_{T1} - R_{T2} + \frac{V_{D2}}{I_{T2}}$$

The assumed diode voltage can be used in the above equation, or to achieve more accurate calculation of an electrical characteristic of the hose assembly, an additional measurement can be taken to calculate the forward diode forward bias voltage ($V_{D2}$). In some embodiments, a third measurement can be performed by applying a third electrical signal across the circuit element (step 410) such that the diode is forward-biased, but at a different voltage from the second measurement of step 406. This can be accomplished, for example, by switching in a lower or higher voltage source, or by including a switch-activated scalar resister. In this arrangement, the electrical property of the hose assembly and monitoring assembly can again be determined while this third electrical signal is applied (step 412). Total resistance ($R_{T3}$) is derived the same as total resistance ($R_{T2}$).

$$R_{T2} - R_{T3} = \frac{R_H \times R_{D2}}{R_H + R_{D2}} - \frac{R_H \times R_{D3}}{R_H + R_{D3}}$$

$$R_{T2} - R_{T3} = \frac{R_H \times \frac{V_{D2}}{I_{T2} - \frac{V_{D2}}{R_H}}}{R_H + \frac{V_{D2}}{I_{T2} - \frac{V_{D2}}{R_H}}} - \frac{R_H \times \frac{V_{D3}}{I_{T2} - \frac{V_{D3}}{R_H}}}{R_H + \frac{V_{D2}}{I_{T3} - \frac{V_{D3}}{R_H}}}$$

$$R_{T2} - R_{T3} = \frac{R_H \times V_{D2}}{R_H \times I_{T2} - V_{D2} + V_{D2}} - \frac{R_H \times V_{D3}}{R_H \times I_{T3} - V_{D3} + V_{D3}}$$

$$R_{T2} - R_{T3} = \frac{R_H \times V_{D2}}{R_H \times I_{T2}} - \frac{R_H \times V_{D3}}{R_H \times I_{T3}}$$

$$R_{T2} - R_{T3} = \frac{V_{D2}}{I_{T2}} - \frac{V_{D3}}{I_{T3}}$$

In the diode example illustrated in FIGS. 10-11, a forward bias voltage for the diode may be different in the second and third measurements ($V_{D2}$, $V_{D3}$), for example due to different applied voltages. Therefore, rather than assuming that forward bias voltages are the same at different diode excitation levels ($V_{D2}$, $V_{D3}$) it can be assumed that:

$$V_{D3} = K \times V_{D2}$$

Where K is the increase in diode voltage caused by a higher diode excitation, and $I_S$ is the diode's reverse bias saturation current, then a diode equation can be used to determine the following relationship between the diode voltages:

$$K = \frac{V_{D3}}{V_{D2}} = \frac{\ln\frac{I_{D3}}{I_S}}{\ln\frac{I_{D2}}{I_S}} = \frac{\ln I_{D3} - \ln I_S}{\ln I_{D2} - \ln I_S}$$

If less accuracy is acceptable, K may be approximated as a constant, or even as equal to 1.
So $$R_{T2} - R_{T3} = \frac{V_{D2}}{I_{T2}} - \frac{K \times V_{D2}}{I_{T3}}$$

$$I_{T2} \times I_{T3} \times (R_{T2} - R_{T3}) = I_{T3} \times V_{D2} - I_{T2} \times K \times V_{D2}$$

$$I_{T2} \times I_{T3} \times (R_{T2} - R_{T3}) = (I_{T3} - K \times I_{T2}) \times V_{D2}$$

$$V_{D2} = V_{D3} \div K = I_{T2} \times I_{T3} \times (R_{T2} - R_{T3}) \div (I_{T3} - K \times I_{T2})$$

This calculated value of $V_{D2}$ can be used in the hose resistance calculation as follows:

$$R_H = R_{T1} - R_{T2} + \frac{V_{D2}}{I_{T2}}$$

Referring now to FIG. 13 overall, it is recognized that the two or more measurements and related calculations can be performed periodically, with the calculated hose resistance 206 ($R_{Hose}$) or other electrical characteristic of the hose tracked in the analysis unit 310. In such arrangements, changes in the calculated hose resistance (e.g., a lower or higher than expected resistance) may indicate impending failure of the hose, for example due to a breakdown in one or more layers 18-26 of the hose 16.

Detection of large contact resistance ($R_C$), and consisting also of wire resistance and monitoring unit connector and switch resistances, is important for detecting failure of the hose sensing circuit. $R_C$ can be calculated from any of the following equations:

$$R_{T1} = R_C + R_H$$

$$R_{T2} = R_C + \frac{R_H \times R_{D2}}{R_H + R_{D2}}$$

$$R_{T3} = R_C + \frac{R_H \times R_{D3}}{R_H + R_{D3}}$$

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A hose degradation monitoring system comprising:
a hose assembly including a hose having a first conductive layer and a second conductive layer;
a monitoring circuit in electrical communication with the first and second conductive layers, the monitoring circuit including a circuit element having a non-linear electrical property in response to changed voltage, the monitoring circuit mounted in a monitoring assembly including a circuit board electrically connected at contacts to the first conductive layer and the second conductive layer;
wherein the monitoring circuit includes a diagnostic unit configured to apply a plurality of different voltages across the circuit element, the plurality of different voltages including at least a first voltage, a second voltage, and a third voltage, and
wherein the monitoring circuit is further configured to calculate an electrical characteristic of the hose assembly based at least in part on electrical characteristics of the hose assembly in response to the plurality of different voltages while accounting for a resistance of the contacts determined based at least in part on a response to the non-linear electrical property of the circuit element.

2. The hose fault detection system of claim 1, wherein the diagnostic unit is located remotely from the hose assembly.

3. The hose fault detection system of claim 1, further comprising a monitoring assembly including a housing and a circuit board, the circuit board positioned in a channel of the housing and including electrical contacts oriented toward the hose assembly, the electrical contacts electrically connecting the monitoring circuit to the first and second conductive layers.

4. The hose fault detection system of claim 1, wherein the circuit element includes a diode connected across the first and second conductive layers.

5. The hose fault detection system of claim 4, wherein the diode has a resistance that changes non-linearly as a function of voltage applied across the diode.

6. The hose fault detection system of claim 1, wherein the monitoring circuit is at least partially incorporated in a monitoring assembly mounted to the hose assembly.

7. A method of monitoring degradation of a hose assembly, the method comprising:
applying a first voltage across a circuit element connected between first and second conductive layers of a hose assembly;
while applying the first voltage, detecting a first electrical characteristic of the circuit element;
applying a second voltage across the circuit element, the second voltage different from the first voltage;
while applying the second voltage, detecting a second electrical characteristic of the circuit element;
applying a third voltage across the circuit element, the third voltage different from the first and second voltages;
while applying the third voltage, detecting a third electrical characteristic of the circuit element; and
calculating an electrical characteristic of the hose assembly based at least in part on the first and second electrical characteristics.

8. The method of claim 7, wherein calculating the electrical characteristic of the hose assembly is further based on the third electrical characteristic.

9. The method of claim 7, wherein the second voltage is a voltage opposite that of the first voltage.

10. The method of claim 7, wherein calculating an electrical characteristic of the hose assembly comprises calculating a resistance of the hose assembly.

11. The method of claim 10, wherein the resistance of the hose assembly is calculated using the equation:

$$R_H = R_{T1} - R_{T2} + \frac{V_{D2}}{I_{T2}}$$

wherein $R_H$ is the resistance of the hose assembly, $R_{T1}$ is a combination of the resistance of the hose assembly and a contact resistance, $R_{T2}$ is a combination of the contact resistance with a parallel resistance of the hose assembly and a diode resistance, $V_{D2}$ is the second voltage, and $I_{T2}$ is a total current.

12. The method of claim 7, further comprising calculating an electrical characteristic of the circuit, wherein calculation of an abnormal electrical characteristic of the circuit represents a circuit fault occurring in the monitoring assembly.

13. The method of claim 12, wherein the calculating the electrical characteristic of the circuit comprises calculating a large contact resistance.

14. A hose degradation monitoring system comprising:
a hose assembly including a hose having a first conductive layer and a second conductive layer;
a monitoring circuit including a diode electrically connected between the first conductive layer and the second conductive layer, wherein the diode has a resistance that changes non-linearly as a function of voltage applied across the diode; and
a monitoring assembly including a housing and a circuit board, the circuit board positioned in a channel of the housing and including electrical contacts oriented toward the hose assembly, the electrical contacts electrically connecting the monitoring circuit to the first and second conductive layers;
wherein the monitoring circuit includes a diagnostic unit configured to apply a plurality of different voltages across the diode, the plurality of different voltages including at least a first voltage, a second voltage, and a third voltage, and
wherein the monitoring circuit further configured to calculate an electrical characteristic of the hose assembly based at least in part on electrical characteristics of the hose assembly in response to the plurality of different voltages while accounting for a resistance of the contacts determined based at least in part on a response to the non-linear resistance of the diode.

* * * * *